United States Patent
Shirakihara et al.

(10) Patent No.: US 11,546,719 B2
(45) Date of Patent: Jan. 3, 2023

(54) INFORMATION PROCESSING METHOD, INFORMATION PROCESSING DEVICE, AND NON-TRANSITORY STORAGE MEDIUM

(71) Applicant: YAMAHA CORPORATION, Hamamatsu (JP)

(72) Inventors: Futoshi Shirakihara, Hamamatsu (JP); Tadashi Morikawa, Hamamatsu (JP); Kentaro Noto, Hamamatsu (JP); Akihiro Miwa, Kosai (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/207,820

(22) Filed: Mar. 22, 2021

(65) Prior Publication Data
US 2021/0306794 A1     Sep. 30, 2021

(30) Foreign Application Priority Data

Mar. 24, 2020  (JP) .............................. JP2020-052801
Feb. 26, 2021  (JP) .............................. JP2021-029793

(51) Int. Cl.
*H04S 7/00*     (2006.01)
*H04R 29/00*    (2006.01)

(52) U.S. Cl.
CPC ............. *H04S 7/40* (2013.01); *H04R 29/008* (2013.01)

(58) Field of Classification Search
None
See application file for complete search history.

(56) References Cited

U.S. PATENT DOCUMENTS

2007/0019823 A1*  1/2007  Miyazaki ............... H04S 7/301
                                                      381/87
2020/0120438 A1*  4/2020  Kim ...................... H04S 3/008

FOREIGN PATENT DOCUMENTS

| CN | 1901755 A    | 1/2007 |
|----|--------------|--------|
| EP | 1746522 A2   | 1/2007 |
| EP | 2182743 A2   | 5/2010 |
| JP | 2018074280 A | 5/2018 |
| JP | 2018148323 A | 9/2018 |

OTHER PUBLICATIONS

Extended European Search Report issued in European Appln. No. 21163687.3 dated Oct. 8, 2021.
Extended European Search Report issued in Intl. Appln. No. 21163687.3 dated Aug. 10, 2021.
Office Action issued in Chinese Appln. No. 202110290568.1 dated Jul. 19, 2022. English machine translation provided.

* cited by examiner

*Primary Examiner* — Kenny H Truong
(74) *Attorney, Agent, or Firm* — Rossi, Kimms & McDowell LLP

(57) ABSTRACT

An information processing method includes: receiving first space information including a first coordinate system of one of a logical space or a physical space, and second space information including a second coordinate system of the other of the logical space or the physical space; receiving first sound localization information indicating a position where a sound image is to be localized in the first coordinate system; and transforming the first sound localization information into second sound localization information indicating a position where the sound image is to be localized in the second coordinate system.

24 Claims, 16 Drawing Sheets

INFORMATION PROCESSING METHOD, INFORMATION PROCESSING DEVICE, AND NON-TRANSITORY STORAGE MEDIUM

CROSS REFERENCE TO RELATED APPLICATIONS

This Nonprovisional application claims priority under 35 U.S.C. § 119(a) on Patent Application No. 2020-052801 filed in Japan on Mar. 24, 2020 and Japanese Patent Application No. 2021-029793, filed on Feb. 26, 2021, the entire contents of which are hereby incorporated by reference.

BACKGROUND

Technical Field

The present disclosure relates to an information processing method, an information processing device and a non-transitory storage medium storing a program executable by a computer to execute the information processing method.

Background Information

A mixing board disclosed in Japanese Patent Application Publication No. 2018-74280 receives coordinates indicating a sound localization point in a rectangular parallelepiped space. The mixing board disclosed in Japanese Patent Application Publication No. 2018-74280 calculates the volume levels of sounds to be outputted from a plurality of speakers set in a space such that the virtual sound image is localized to the point indicated by the coordinates.

SUMMARY

However, a physical space, such as a concert hall or the like, is not necessarily a rectangular parallelepiped. A mixing board as disclosed in Japanese Patent Application Publication No. 2018-74280 does not consider a coordinate system corresponding to the physical space, and even though receiving coordinates of a sound localization point in a rectangular parallelepiped space, such a mixing board, in some cases, cannot achieve sound localization as desired by the user.

An object of the present disclosure is to provide an information processing method, an information processing device and a non-transitory storage medium that allow achievement of sound localization in consideration of the shape of a physical space.

An information processing method according to an embodiment of the present disclosure includes: receiving first space information including a first coordinate system of one of a logical space or a physical space, and second space information including a second coordinate system of the other of the logical space or the physical space; receiving first sound localization information indicating a position where a sound image is to be localized in the first coordinate system; and transforming the first sound localization information into second sound localization information indicating a position where the sound image is to be localized in the second coordinate system.

An embodiment of the present disclosure makes it possible to achieve sound localization in consideration of the shape of a physical space.

DETAILED DESCRIPTION

Figure 1:
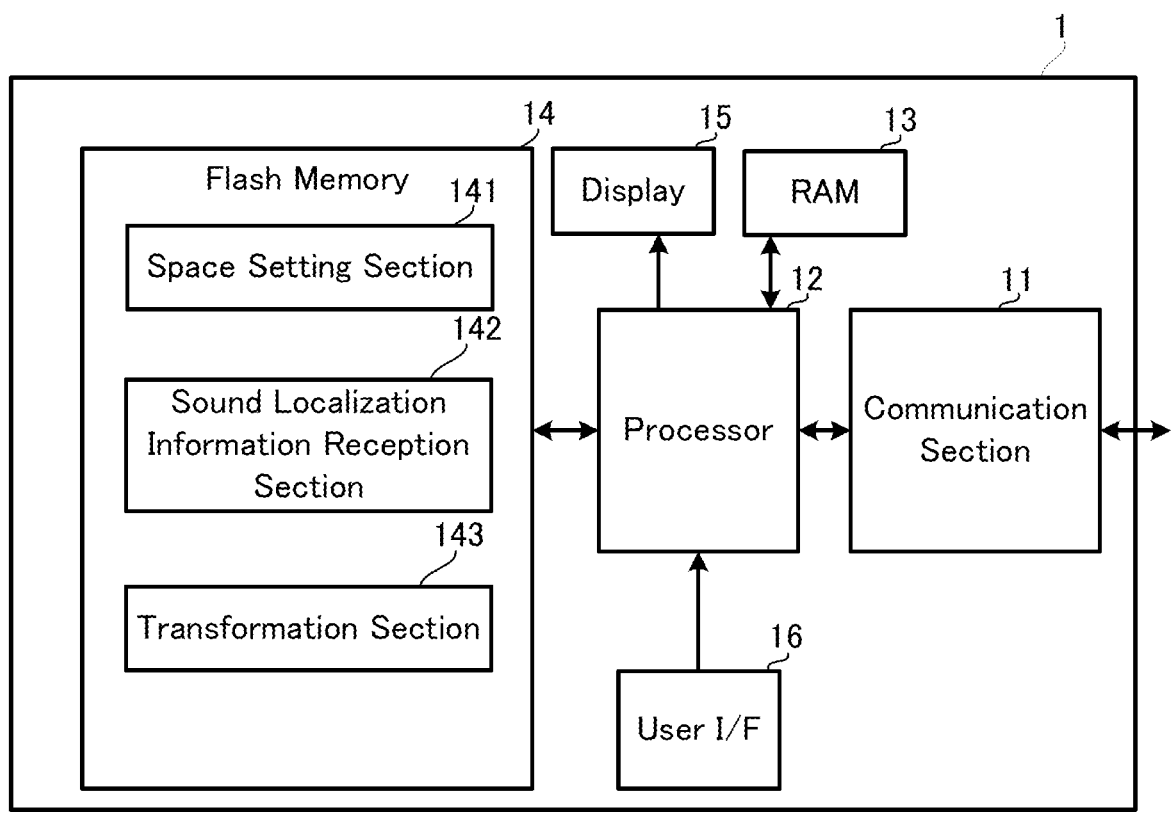
FIG. 1 is a block diagram showing the configuration of an information processing device 1.

FIG. 1 is a block diagram showing the configuration of an information processing device 1. The information processing device 1 includes a communication section 11, a processor 12, a RAM 13, a flash memory 14, a display 15, and a user I/F 16.

The information processing device 1 is a personal computer, a smartphone, a tablet computer, or the like. Also, audio equipment, such as an audio mixer or the like, is an example of an information processing device.

The communication section 11 communicates with another device such as a server or the like. The communication section 11 has a wireless communication function, such as Bluetooth (registered tradename), Wi-Fi (registered tradename), etc., and a wire communication function, such as a USB, a LAN, etc. The communication section 11 acquires space information indicating the shape of a physical space, for example, a concert hall or the like. The space information is information indicating a two-dimensional or three-dimensional coordinate system using a specified point as a reference point (an origin). The space information is information indicating a two-dimensional or three-dimensional coordinate system, such as CAD data and so on indicating the shape of a physical space, i.e., a concert hall or the like.

The processor 12 is a CPU, a DSP, a SoC (system on a chip), or the like. The processor 12 reads out a program from the flash memory 14, which is a storage medium, and temporarily stores the program in the RAM 13, and the processor 12 carries out various operations. The processor 12 constructs a functional structure including a space setting section 141, a sound localization information reception section 142, a transformation section 143, etc., following the read-out program for performing a plurality of tasks, such as space setting task, sound localizing information receiving task, and transforming task. The program is not necessarily stored in the flash memory 14. The processor 12, for example, may download the program from another device such as a server or the like and may store the program temporarily in the RAM 13, when necessary.

The display 15 is an LCD or the like. The display 15, for example, displays a sound localization setting screen as shown in FIG. 2.

The user I/F 16 is an example of an operation section. The user I/F 16 is a mouse, a keyboard, a touch panel, or the like. The user I/F 16 receives input from the user. The touch panel may be stacked on the display 15.

Figure 2:
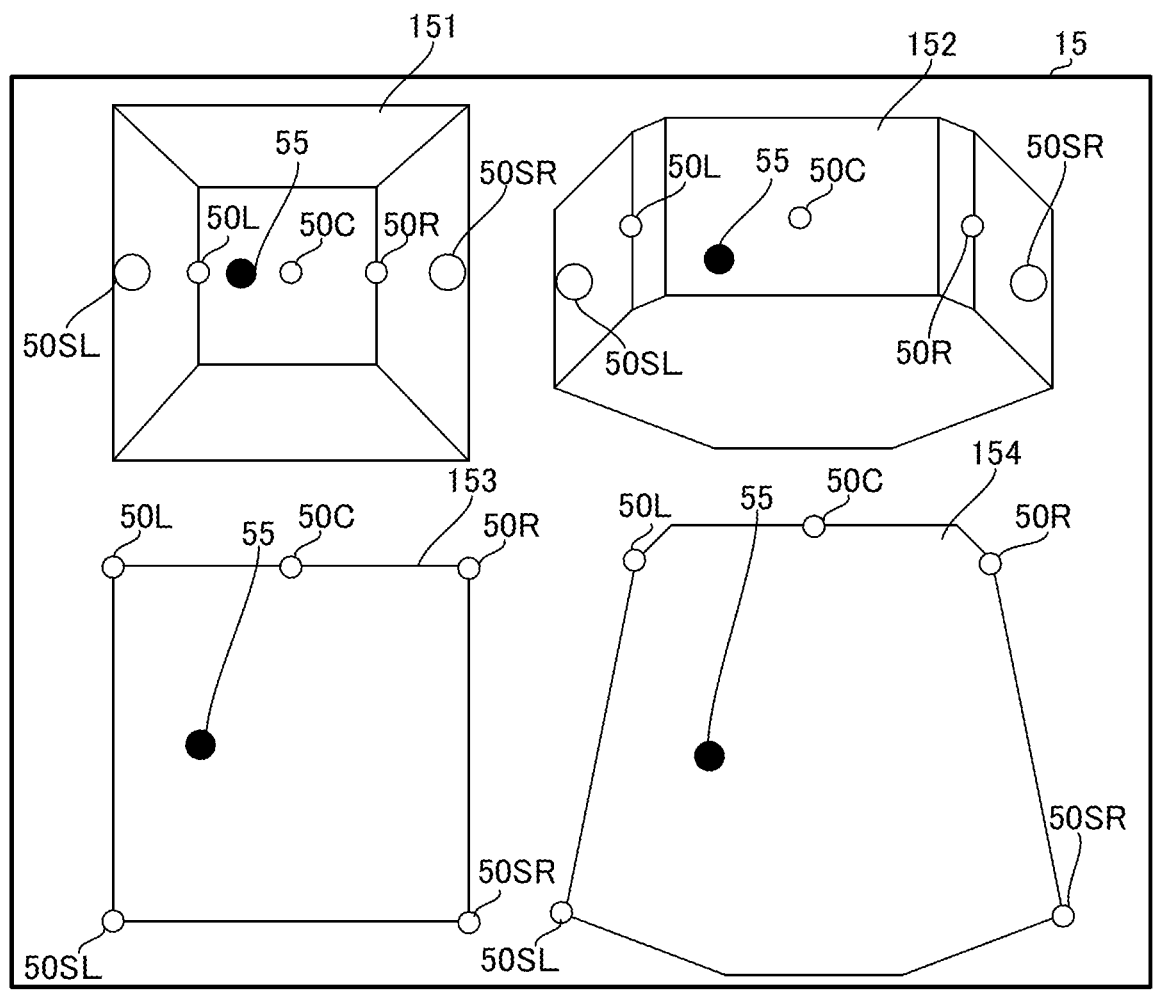
FIG. 2 is an exemplary sound localization setting screen displayed on a display 15.
Figure 3:
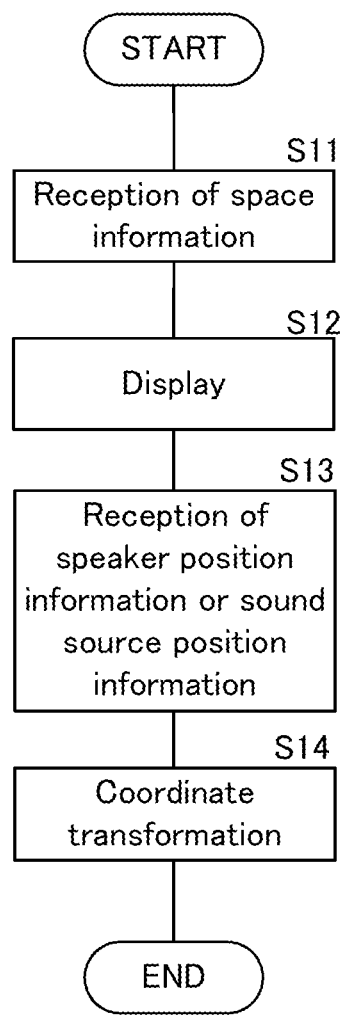
FIG. 3 is a flowchart showing a process carried out by a processor 12.

With reference to FIGS. 2 and 3, a setting screen for sound localization is described. FIG. 2 is an exemplary sound localization setting screen displayed on the display 15. FIG. 3 is a flowchart showing a process carried out by the processor 12. The sound localization setting screen shown in FIG. 2 is an example of a contents editing screen. On the sound localization setting screen, the user edits the sound localization position of the sound source included in the contents.

The display 15 displays a logical spatial image 151 of a logical coordinate system, and a physical spatial image 152 of a physical coordinate system. In this example, the display 15 displays the logical spatial image 151 on the upper left side of the screen and displays the physical spatial image 152 on the upper right side of the screen. The display 15 also displays a logical planar image 153 on the lower left side of the screen and a physical planar image 154 on the lower right side of the screen.

The logical spatial image 151 is a rectangular parallelopiped, for example. The logical planar image 153 corresponds to a planar view of the logical spatial image 151. The physical spatial image 152 is an octagonal prism, for example. The physical planar image 154 corresponds to a planar view of the physical spatial image 152.

First, the space setting section 141 of the processor 12 receives first space information indicating a logical space, and second space information indicating a physical space such as a concert hall or the like (S11).

The first space information is information defining a logical coordinate system. The logical coordinate system includes, for example, normalized coordinates having values from 0 to 1. In the present embodiment, the space setting section 141 receives, as the first space information, information about a parallelopiped space. However, the space setting section 141 may receive space information about any other shape such as a polygonal pyramid, a prism, a polyhedron, a circular cylinder, a circular cone, a sphere, or the like. The space setting section 141 may receive information about a two-dimensional space. The two-dimensional space includes, for example, a polygon composed of straight lines, a round shape composed of curved lines, a composite shape including straight lines and curved lines, etc.

The second space information is information defining a physical coordinate system. The physical coordinate system is a two-dimensional or three-dimensional coordinate system included in CAD data or the like for showing the shape of a physical space such as a concert hall or the like. The space setting section 141 of the processor 12, for example, reads out the information including the two-dimensional or three-dimensional coordinate system, such as the CAD data or the like, from the flash memory 14, and thereby receives the second space information.

Next, the space setting section 141 generates the logical spatial image 151, the physical spatial image 152, the logical planar image 153 and the physical planar image 154, and displays these images on the display 15 (S12). In the example shown by FIG. 2, the logical spatial image 151 is an elevational view of a cube, and the logical planar image 153 is a square image. The physical spatial image 152 and the physical planar image 154 are images simulating a real space such as a concert hall or the like. The space setting section 141 generates the physical spatial image 152 and the physical planar image 154 based on the information including the two-dimensional or three-dimensional coordinate system, such as the CAD data and the like.

Next, the sound localization information reception section 142 of the processor 12 receives speaker position information or sound source position information (S13). The speaker position information and the sound source position information are coordinates in the logical coordinate system, and either one is an example of first sound localization information.

The user manipulates the user I/F 16 to edit the speaker position information or the sound source position information on the logical spatial image 151 or the logical planar image 153 shown in FIG. 2. For example, in the example shown by FIG. 2, in the logical spatial image 151 and the logical planar image 153, the user locates a center speaker 50C, a left speaker 50L, a right speaker 50R, a left rear speaker 50DL, and a right rear speaker 50SR. The center speaker 50C, the left speaker 50L, the right speaker 50R, the left rear speaker 50SL, and the right rear speaker 50SR are located at a middle level with respect to a height direction.

In the logical planar image 153, when the upper-left corner is defined as an origin, the position of the left speaker SOL is indicated by coordinates (x, y)=(0, 0). The position of the right speaker SOR is indicated by coordinates (x, y)=(1, 0). The position of the center speaker 50C is indicated by coordinates (x, y)=(0.5, 0). The position of the left rear speaker 50SL is indicated by coordinates (x, y)=(0, 1). The position of the right rear speaker 50SR is indicated by coordinates (x, y)=(1, 1).

In the example shown by FIG. 2, the user sets the sound source position of a sound source 55 at a point on the left of the center (between the left end and the center) in the logical planar image 153. Specifically, the sound source position where the sound source 55 is to be localized is indicated by coordinates (x, y)=(0.25, 0.5).

In the example shown by FIG. 2, the heights of the center speaker 50C, the left speaker SOL, the right speaker 50R, the left rear speaker 50SL, the right rear speaker 50SR, and the sound source are all indicated by z=0.5.

The sound localization information reception section 142 receives the speaker position information or the sound source position information by, for example, receiving input for editing the speaker position information or sound source position information from the user as shown in FIG. 2, (YES at S13).

The transformation section 143 performs coordinate transformation based on the received speaker position information or sound source position information (S14).

Figure 4:
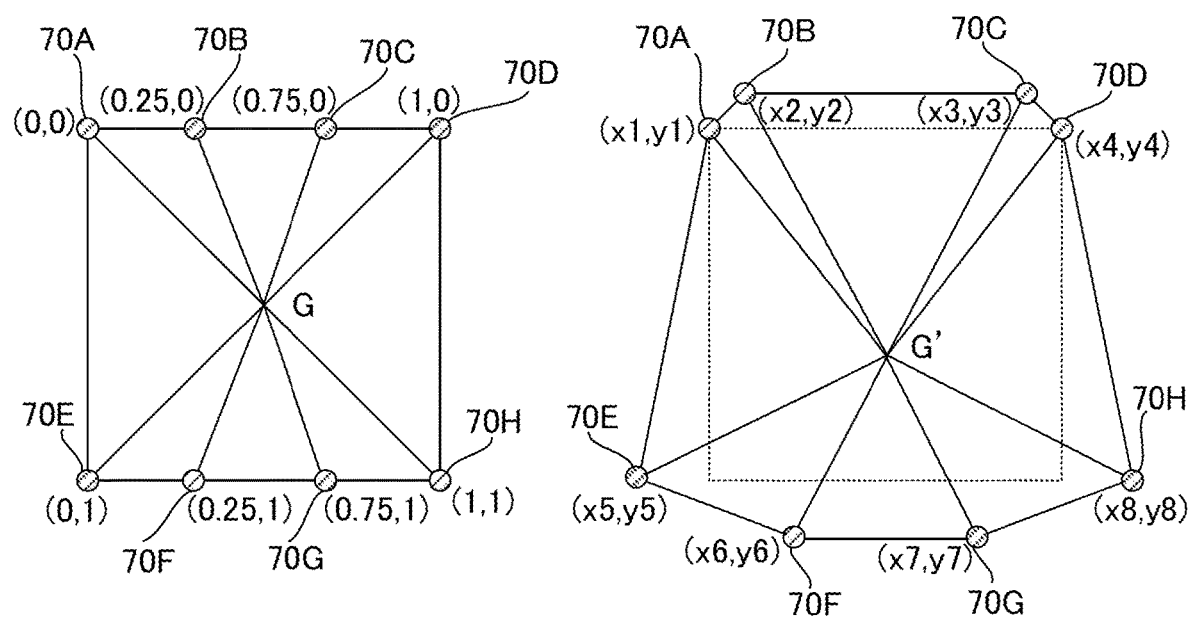
FIG. 4 is a diagram illustrating a concept of coordinate transformation.
Figure 5:
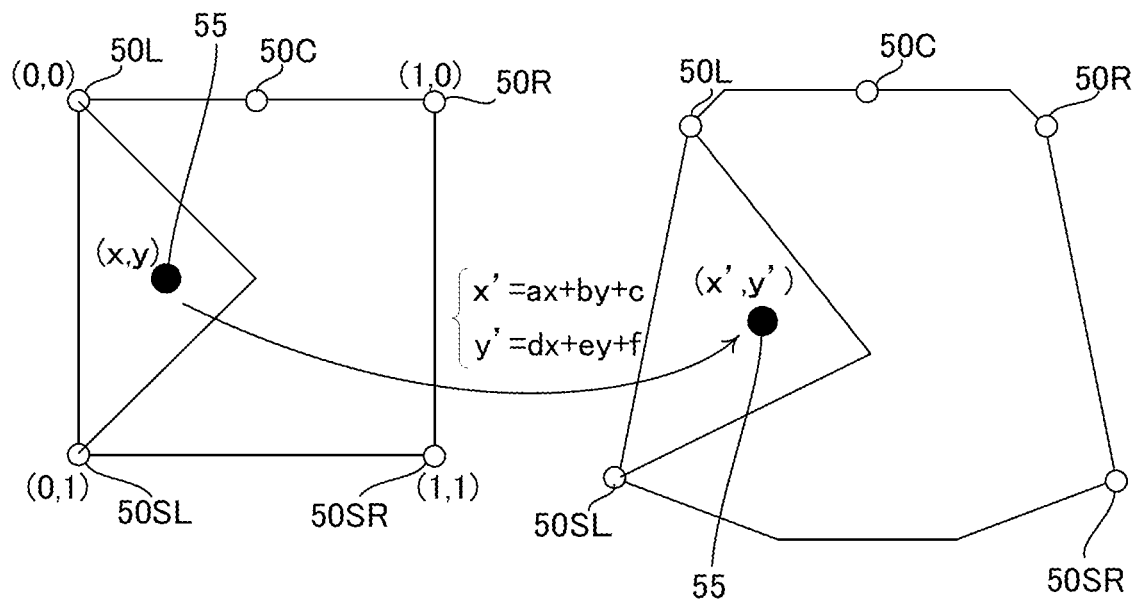
FIG. 5 is a diagram illustrating a concept of coordinate transformation.

FIGS. 4 and 5 are diagrams illustrating a concept of coordinate transformation. The transformation section 143 transforms the speaker position information and the sound source position information by transforming the first coordinates in the logical coordinate system defined by the first space information into second coordinates in the physical coordinate system defined by the second space information. In the example shown by FIG. 4, in the physical coordinate system, there are eight reference points, 70A(x1, y1), 70B (x2, y2), 70C(x3, y3), 70D(x4, y4), 70E(x5, y5), 70F(x6, y6), 70G(x7, y7), and 70H(x8, y8), and in the logical coordinate system before transformation, there are eight reference points 70A(0, 0), 70B(0.25, 0), 70C(0.75, 0), 70D(1, 0), 70E(0, 1), 70F(0.25, 1), 70G(0.75, 1), and 70H(1, 1). The transformation section 143 figures out a centroid G of the eight reference points in the logical coordinate system before transformation and a centroid G' of the eight reference points in the physical coordinate system after transformation, and then, the transformation section 143 generates triangular meshes by using these centroids as centers. The transformation section 143 transforms the internal space of each triangle in the logical coordinate system to an internal space of a triangle in the physical coordinate system by a specified coordinate transformation. For the transformation, for example, an affine transformation is used. The affine transformation is an example of a geometric transformation. According to the affine transformation, an x-coordinate (x') and a y-coordinate (y') after transformation are each defined by a function of x-coordinate (x) and y-coordinate (y) before transformation. According to the affine transformation, specifically, the coordinate transformation is performed by use of the following functions: $x'=ax+by+c$; and $y'=dx+ey+f$. The coefficients a to f can be definitely calculated from the coordinates of the three apexes of a triangle before transformation and the coordinates of the three apexes of a triangle after transformation. The transformation section 143 calculates affine transformation coefficients for all the triangles in this way, and thereby transforms first coordinates in the logical coordinate system into second coordinates in the physical coordinate system, which are included in the second space information. The coefficients a to f may be calculated by the least-square method.

Then, the transformation section 143 transforms coordinates serving as the speaker position information and the sound source position information by using the coefficients a to f. As shown in FIG. 5, the transformation section 143 transforms coordinates (x, y) indicating the position of the sound source 55 in the logical coordinate system into coordinates (x', y') in the physical coordinate system.

In this way, the coordinates serving as the speaker position information and the sound source position information are transformed into second sound localization information matching to the shape of the physical space. The processor 12, for example, stores the second sound localization information in the flash memory 14. Alternatively, the processor 12, for example, sends the second sound localization information to another device, such as audio equipment or the like, via the communication section 11. The audio equipment carries out operation for sound localization, based on the second sound localization information received thereby. The audio equipment calculates level balance between audio signals sent to the plurality of speakers and adjusts levels of the audio signals, based on the speaker position information and the sound source position information included in the second sound localization information, such that the sound image is localized to a specified point. Therefore, the information processing device 1 according to the present embodiment can carry out sound localization in consideration of the shape of a physical space.

Figure 9:
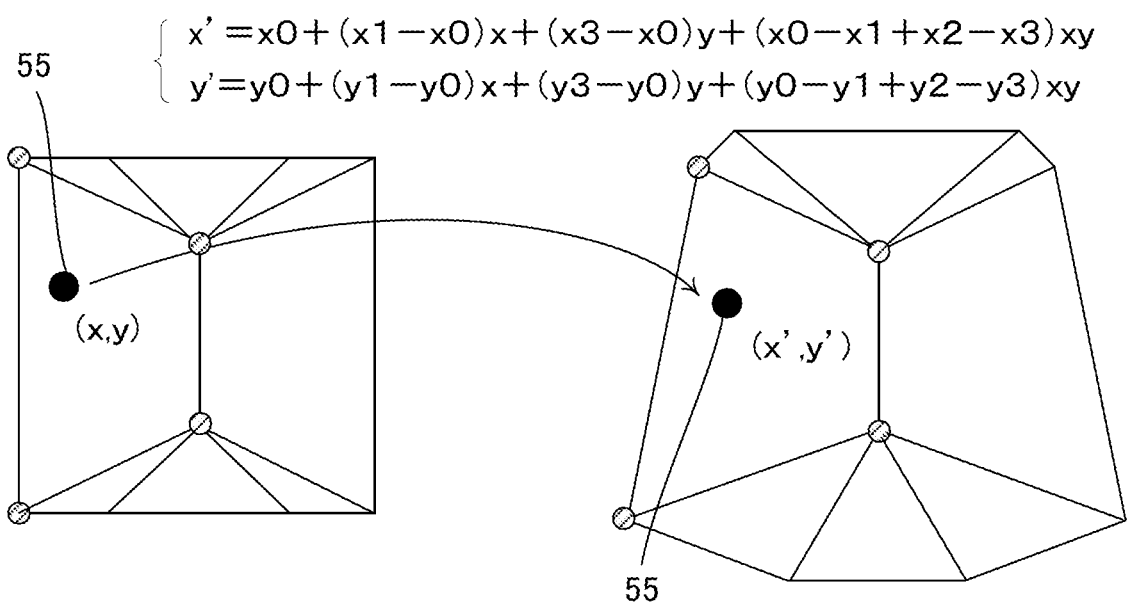
FIG. 9 is an illustration diagram of modified coordinate transformation.

Each of the meshes does not need to be a triangular mesh, and it may be a mesh of any other polygonal shape or a combination thereof. For example, as shown in FIG. 9, the transformation section 143 may generate quadrangular meshes and may carry out coordinate transformation. The transformation method is not limited to the affine transformation. For example, the transformation section 143 may transform each of the quadrangular meshes based on the following formulas and may transform coordinates (x, y) indicating the position of the sound source 55 in the logical coordinate system into coordinates (x', y') in the physical coordinate system. (In the following formulas, x0, y0, x1, y1, x2, y2, x3 and y3 denote coordinates of transformation points.)

$$x'=x0+(x1-x0)x+(x3-x0)y+(x0-x1+x2-x3)xy$$

$$y'=y0+(y1-y0)x+(y3-y0)y+(y0-y1+y2-y3)xy$$

The transformation method may be any other geometric transformation, such as, i.e., isometric mapping, homothetic transformation, projective transformation, etc. For example, the projective transformation can be expressed by the following formulas: $x'=(ax+by+c)/(gx+hy+1)$; and $y'=(dx+ey+f)/(gx+hy+1)$. The coefficients are calculated in the same way as in the case of affine transformation. The eight coefficients (a to h) defining the quadrangular projective transformation are definitely calculated by a set of eight simultaneous equations. Alternatively, the coefficients may be calculated by the least-square method.

Figure 6:
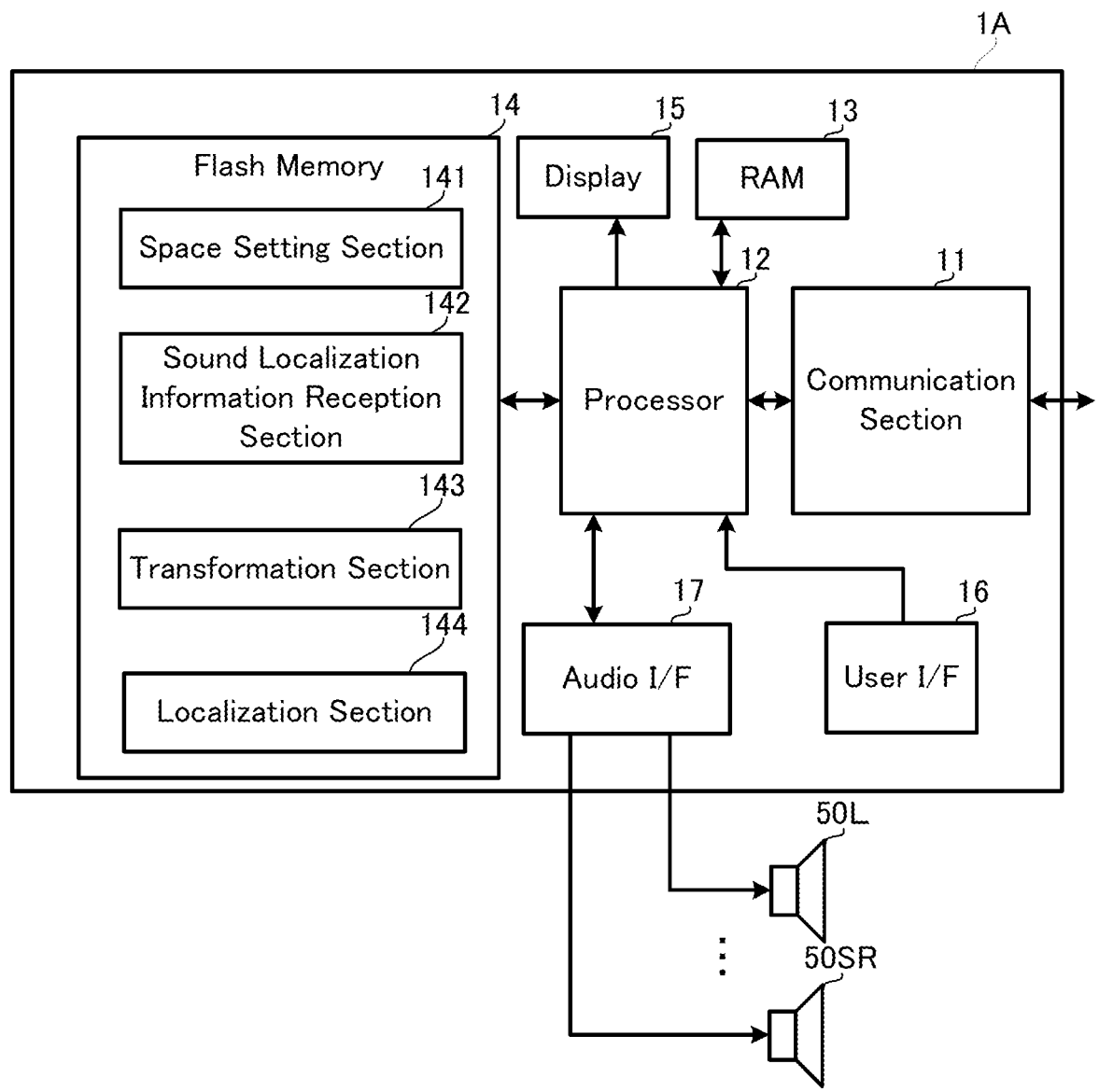
FIG. 6 is a block diagram showing the configuration of an information processing device 1A according to Modification 1.
Figure 7:
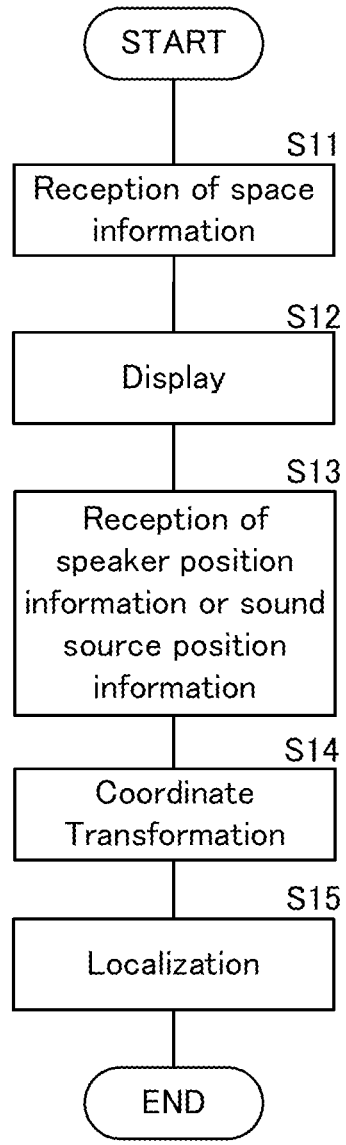
FIG. 7 is a flowchart showing a process carried out by the information processing device 1A.

FIG. 6 is a block diagram showing the configuration of an information processing device 1A according to Modification 1. FIG. 7 is a flowchart showing a process carried out by the information processing device 1A. The same structure, function and operation as those of the information processing device 1 are provided with the same reference numerals, and the descriptions thereof are omitted.

The information processing device 1A further includes an audio I/F 17. The audio I/F 17 is an analogue audio terminal, a digital audio terminal, or the like. The processor 12 acquires an audio signal from a sound source via the audio I/F 17. Thus, the processor 12 functions as an audio signal acquisition section. The audio signal may be acquired from an external device via the communication section 11. Also, the audio signal may be stored in the flash memory 14.

The audio I/F 17 is connected to the center speaker 50C, the left speaker 50L, the right speaker 50R, the left rear speaker 50SL and the right rear speaker 50SR, which are set in a real space, such as a concert hall or the like.

The processor 12 includes a DSP. The processor 12 carries out specified signal processing of the audio signal. The processor 12 outputs the processed audio signal to the center speaker 50C, the left speaker 50L, the right speaker 50R, the left rear speaker 50SL and the right rear speaker 50SR via the audio I/F 17.

The processor 12 reads out a program stored in the flash memory 14 to the RAM 13 and thereby constructs a functional structure as a localization section 144. The localization section 144 of the processor 12 carries out processing, based on the speaker position information and the sound source position information (second sound localization information) obtained by the transformation carried out by the transformation section 143, such that the sound image of the audio signal is localized to a position corresponding to the second sound localization information (S15). Specifically the localization section 144 calculates level balance among audio signals sent to the center speaker 50C, the left speaker 50L, the right speaker 50R, the left rear speaker 50SL and the right rear speaker 50SR and adjusts levels of the audio signals, based on the speaker position information and the sound source position information included in the second sound localization information, such that the sound image is localized to the specified position. The information processing device may carry out sound localization processing in this way.

FIGS. 2 to 5 show coordinate transformation in a two-dimensional space (on a plane). However, the information processing device may carry out coordinate transformation in a three-dimensional space. In this case, the values x', y' and z' of the coordinates after transformation are each expressed by a function of x, y and z. The transformation section 143 transforms the speaker position information and the sound source position information by using these functions.

The three-dimensional space may be indicated by information including plane coordinates (x, y) and information about layers stacked in the height direction.

Figure 8:
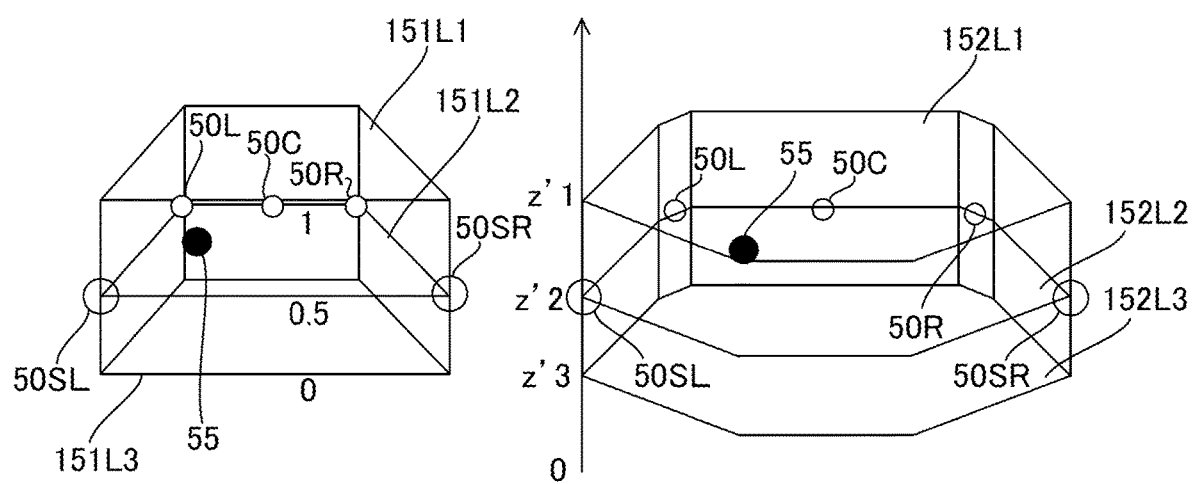
FIG. 8 is a diagram illustrating a concept of layers.

FIG. 8 is a diagram illustrating a concept of layers. The user adjusts the layer, the speaker position information, or the sound source position information by using the user I/F 16. In the example shown by FIG. 8, the user sets heights of three layers stacked in the height direction. The user also designates the speaker positions and the sound source position respectively to one of the respective layers the user selected. In the example shown by FIG. 8, the user sets a layer 151L1, a layer 151L2, a layer 151L3, a layer 152L1, a layer 152L2 and a layer 152L3, and selects any of these layers for designation of the positions of the speakers and the sound source.

The transformation section 143 carries out geometric transformation as described above to obtain plane coordinates (x', y') in the physical coordinate system. Each height coordinate is designated by the user. In the example shown by FIG. 8, in the logical coordinate system, the layer 151L1 is at a level indicated by z=1.0, the layer 151L2 is at a level indicated by z=0.5, and the layer 151L3 is at a level indicated by z=0. The layer 152L1 in the physical coordinate system is at a level corresponding to the highest level in the real space, that is, indicates the ceiling surface. The layer 152L3 in the physical coordinate system is at a level corresponding to the lowest level in the real space, that is, indicates the floor surface. The layer 152L2 is at an intermediate level between the level of the ceiling surface and the level of the floor surface. For example, when the sound source 55 is localized to the layer 151L3 in the logical coordinate system, the transformation section 143 calculates the height coordinate z'3 indicating the layer 152L3 of the physical coordinate system as height information in the second sound localization information.

Either the speaker position information or the sound source position information may indicate coordinates between layers. For example, the speaker positions information may specify the speaker position by using the layers, and the sound source position information may specify a free position in the three-dimensional space as the position of the sound source. In this case, the transformation section 143 generates the sound source position information based on the height information of the layers. For example, the transformation section 143 calculates the height coordinate in the physical coordinate system by linear interpolation. For example, when the sound source is localized between the layer 151L1 and the layer 151L2, the transformation section 143 calculates the height coordinate z' by transforming the height coordinate z of the position of the sound source before transformation in the following way.

$$z'=(z-z1)*(z'2-z'1)/(z2-z1)+z'1$$

The number of layers is not limited to three. The number of layers may be two, or may be four or more.

It should be understood that the present embodiment has been described as an example and that the description is not limiting. The scope of the present disclosure is not limited to the embodiment above and is determined by the claims. Further, the scope of the disclosure shall be deemed to include equivalents of the scope of the claims.

For example, the user may edit the speaker position information and the sound source position information in the physical spatial image 152 or the physical planar image 154. In this case, the space setting section 141 receives space information of a physical coordinate system as the first space information and space information of a logical coordinate system as the second space information. The transformation section 143 transforms the speaker position information and the sound source position information in the physical coordinate system (first sound localization information) into speaker position information and sound source position information in the logical coordinate system (second sound localization information).

Figure 10:
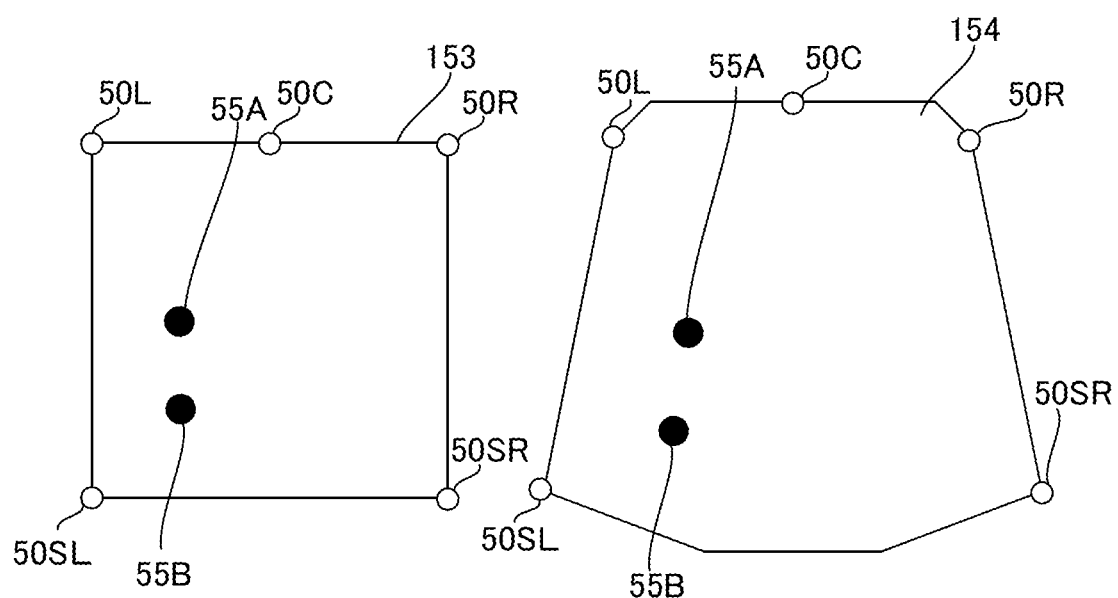
FIG. 10 is a diagram showing an exemplary sound localization setting screen that is displayed on the display 15 for editing of the sound localization information related to sound sources 55A and 55B.

The number of sound sources is not necessarily one. FIG. 10 shows an exemplary sound localization setting screen that is displayed on the display 15 for editing of the sound localization information related to sound sources 55A and 55. In the example of FIG. 10, the information processing device 1 or the information processing device 1A actually displays not only the logical planar image 153 and the physical planar image 154 but also the logical spatial image 151 and the physical spatial image 152. The process carried out by the information processing device 1 is the same as the process shown by the flowchart of FIG. 3, and the process carried out by the information processing device 1A is the same as the process shown by the flowchart of FIG. 7.

In this example, the user locates, in the logical planar image 153 and in the physical planar image 154, sound localization positions of the sound sources 55A and 55B. The position of the sound source 55A is at the coordinates (x1, y1)=(0.25, 0.5), and the position of the sound source 55B is at coordinates (x2, y2)=(0.25, 0.25).

The user edits the sound sources 55A and 55B located in the logical planar image 153 or in the physical planar image 154. For Example, the user changes the positions of both the sound sources 55A and 55B in the physical planar image 154. The transformation section 143 transforms the coordinates indicating the new positions, after the change, of the sound sources 55A and 55B in the physical coordinate system (first sound localization information) into coordinates in the logical coordinate system (second sound localization information).

Figure 11A:
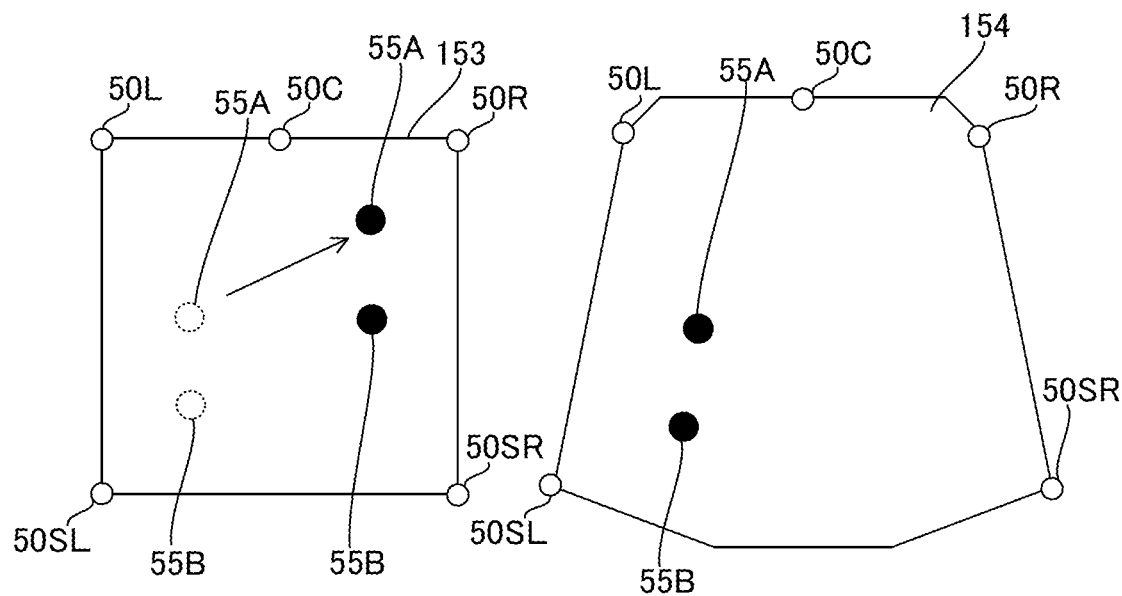
FIGS. 11A and 11B are diagrams showing exemplary sound localization setting screens that are displayed on the display 15 when the sound localization information related to the sound sources 55A and 55B is edited.
Figure 11B:
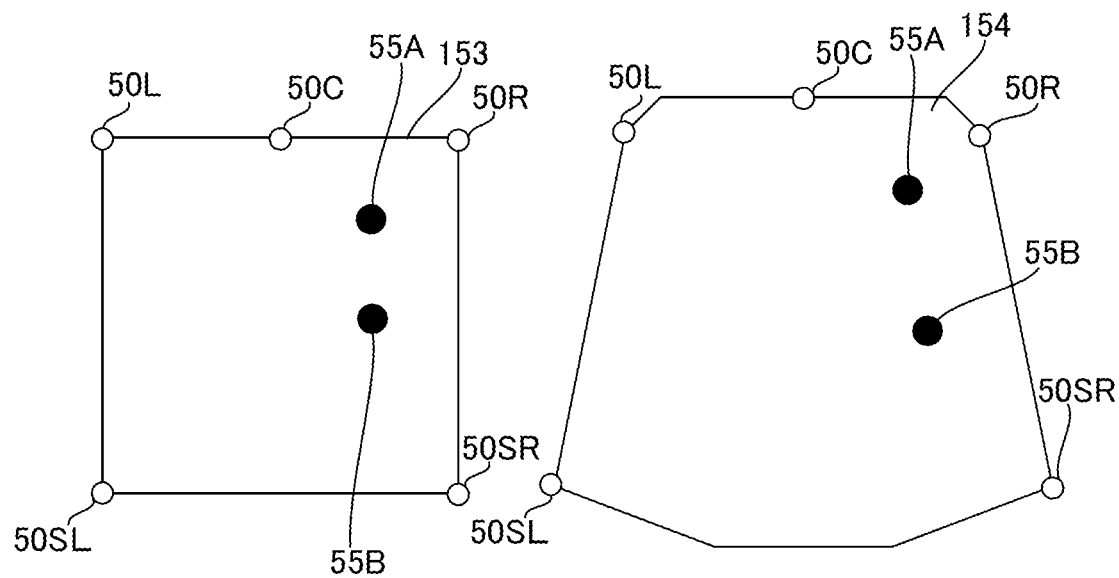

The first sound localization information may be related to a group including a plurality of sound images. FIGS. 11A and 11B are diagrams showing exemplary sound localization setting screens that are displayed on the display 15 when the sound localization information related to the sound sources 55A and 55B is edited.

In this case, the sound sources 55A and 55B are treated as in the same group. Accordingly, the first sound localization information is related to the group including the sound sources 55A and 55B. Further, the second sound localization information is also related to the group including the sound sources 55A and 55B. The user edits either the sound source 55A or the sound source 55B displayed in the logical planar image 153 or the physical planar image 154. The sound localization information reception section 142 changes the first sound localization information while maintaining a relative positional relationship between the plurality of sound images included in the group. For example, as shown in FIG. 11A, the user changes the position of the sound source 55A in the logical planar image 153 from the coordinates (x1, y1)=(0.25, 0.5) to the coordinates (x1, y1)= (0.75, 0.75). Then, the sound localization information reception section 142 changes the position of the sound source 55B while maintaining the relative positional relationship between the sound source 55A and the sound source 55B. When the position of the sound source 55A is at the coordinates (x1, y1)=(0.25, 0.5), the position of the sound source 55B is at the coordinates (x2, y2)=(0.25, 0.25). In this case, the relative positional relationship between the sound source 55A and the sound source 55B is indicated by (x1−x2, y1−y2)=(0, 0.25). Therefore, the sound localization information reception section 142 changes the position of the sound source 55B to the coordinates (x2, y2)=(0.75, 0.5). The display 15 displays the sound sources 55A and 55B in the logical planar image 153 in accordance with the changed coordinates of the sound sources 55A and 55B. Then, the transformation section 143 transforms the coordinates of the new positions of the sound sources 55A and 55B in the logical coordinate system (first sound localization information) into coordinates in the physical coordinate system (second sound localization information). Alternatively, the transformation section 143 may transform the coordinates of the new position of the sound source 55A and the coordinates indicating the relative positional relationship between the sound sources 55A and 55B in the logical coordinate system into corresponding coordinates in the physical coordinate system. In this case, the transformation section 143 may calculate the position of the sound source 55B in the physical coordinate system by using the coordinates of the sound source 55A in the physical coordinate system and the relative positional relationship between the sound sources 55A and 55B in the physical coordinate system. Then, as shown in FIG. 11B, the display 15 changes the positions of the sound sources 55A and 55B in the physical planar image 154.

The user may change either of the positions of the sound sources 55A and 55B in the physical planar image 154. For example, when the user changes the position of the sound source 55A in the physical planar image 154, the sound localization information reception section 142 also changes the position (coordinates) of the sound source 55B while maintaining the relative positional relationship between the sound source 55A and the sound source 55B. The display 15 displays the sound sources 55A and 55B in the physical planar image 154 in accordance with the changed coordinates of the sound sources 55A and 55B. Next, the transformation section 143 transforms the changed coordinates indicating the positions of the sound sources 55A and 55B in the physical coordinate system (first sound localization information) into coordinates in the logical coordinate system (second sound localization point information). Then, the display 15 changes the positions of the sound sources 55A and 55B in the logical planar image 153.

The display 15 may indicate, for example, a representative point of the group. The user may change the position of the representative point of the group, thereby changing the positions of the sound sources 55A and 55B at a time. Also, in this case, the sound localization information reception section 142 changes the coordinates of the sound sources 55A and 55B while maintaining the relative positional relationship between the sound source 55A and the sound source 55B.

Figure 12:
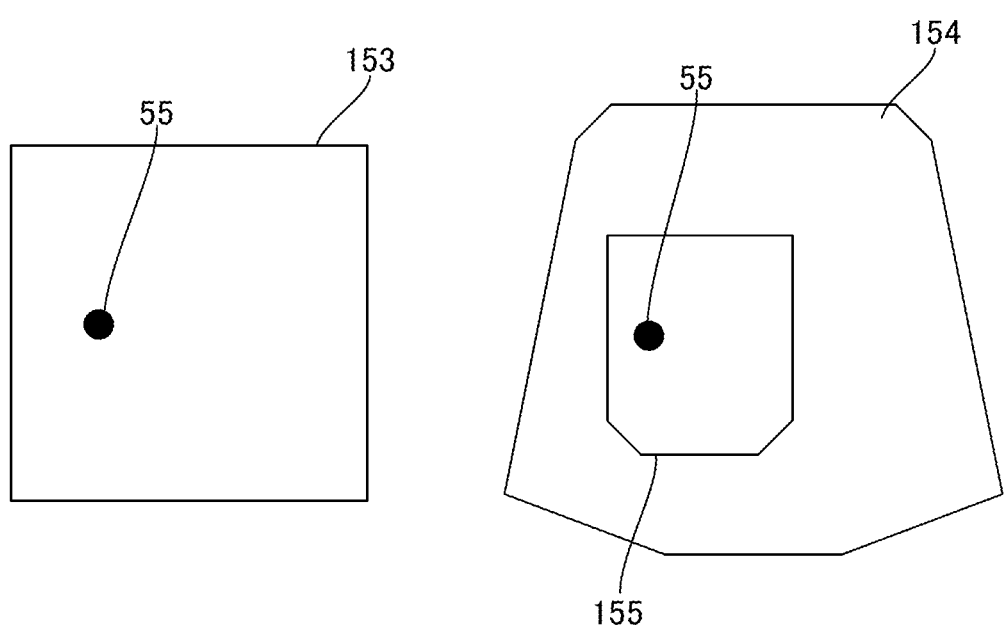
FIG. 12 is a diagram showing another exemplary sound localization setting screen that is displayed on the display 15.

The following description is for an example of receiving setting of space information about another physical coordinate system (third space information) within the physical planar image 154. FIG. 12 is a diagram showing an exemplary sound localization setting screen that is displayed on the display 15 of the information processing device 1 or the information processing device 1A. For the convenience of explanation, speaker positions are not shown in FIG. 12. Also, in this case, the process carried out by the information processing device 1 is the same as the process shown by the flowchart of FIG. 3, and the process carried out by the information processing device 1A is the same as the process shown by the flowchart of FIG. 7.

In this example, the display 15 displays a physical planar image 155 within the physical planar image 154. The physical planar image 155 corresponds to the third space information that is different from the first space information corresponding to the physical planar image 154. The third space information indicates a physical coordinate system. The space setting section 141 receives the setting of the third space information at step S11 shown in FIG. 3 or 7, for example, by reading information including two-dimensional or three-dimensional coordinates, such as CAD data or the like, from the flash memory 14. In this way, the space setting section 141 receives setting of the third space information within the first space information displayed on the display 15. The sound localization information reception section 142 receives information about the position of a sound image in the logical planar image 153 or the physical planar image 154. The transformation section 143 transforms the coordinates of the sound source in the physical coordinate system into coordinates of the sound source in the logical coordinate system or transforms the coordinates of the sound source in the logical coordinate system into coordinates of the sound source in the physical coordinate system.

Figure 13A:
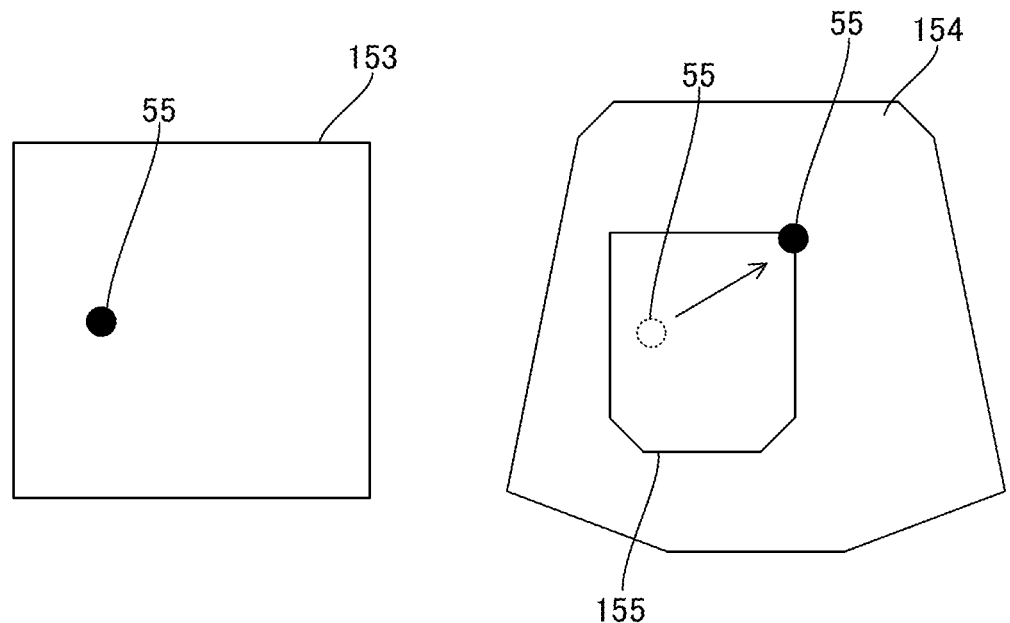
FIGS. 13A and 13B are diagrams showing exemplary sound localization setting screens that are displayed on the display 15.
Figure 13B:
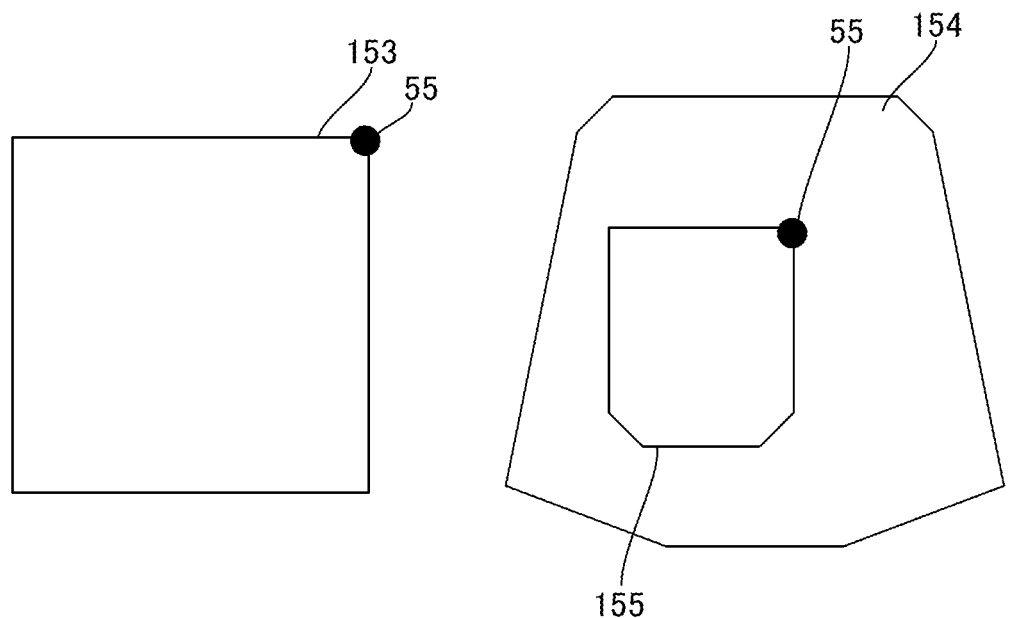

Also, the sound localization information reception section 142 receives a change in the position of the sound source in the logical planar image 153 or the physical planar image 154. For example, as shown in FIG. 13A, the user changes the position of the sound source 55 in the physical planar image 154 to the upper right end of the physical planar image 155.

The display 155 displays the changed position of the sound source 55 in the physical planar image 154. In the example of FIG. 13A, the display 15 displays the position of the sound source 55 at the upper right end of the physical planar image 155, which is displayed within the physical planar image 154.

The transformation section 143 transforms the coordinates of the sound source in the physical coordinate system (first sound localization information) into coordinates of the sound source in the logical coordinate system (second sound localization information) by an affine transformation. In the above-described embodiment, the transformation section 143 carries out transformation between the physical coordinate system corresponding to the physical planar image 154 and the logical coordinate system corresponding to the logical planar image 153. On the other hand, in the example of FIG. 13A, the third space information related to a physical coordinate system corresponds to the second space information related to a logical coordinate system. For example, the coordinates of the lower left end of the physical planar image 155 correspond to coordinates (x, y)=(0, 0) in the logical coordinate system; the coordinates of the upper left end of the physical planar image 155 correspond to coordinates (x, y)=(0, 1) in the logical coordinate system; the coordinates of the lower right end of the physical planar image 155 correspond to coordinates (x, y)=(1, 0) in the logical coordinate system; and the coordinates of the upper right end of the physical planar image 155 correspond to coordinates (x, y)=(1, 1) in the logical coordinate system.

The transformation section 143 calculates the coordinates of the sound source in the logical coordinate system based on the third space information related to the physical planar image 155 and the second space information related to the logical planar image 153. In other words, the transformation section 143 transforms physical coordinates in the physical planar image 155 into logical coordinates in the logical planar image 153.

In the example of FIG. 13A, the sound source 55 is positioned at the upper right end of the physical planar image 155. Therefore, the position of the sound source 55 in the logical coordinate system is at the coordinates (x, y)=(1, 1). The display 55 displays the position of the sound source 55 on the coordinates obtained by the transformation section 143 for indicating the position of the sound source in the logical coordinate system.

In this way, the transformation section 143 transforms first sound localization information in the physical coordinate system into second localization information in the logical coordinate system based on the third space information and the second space information.

Figure 14A:
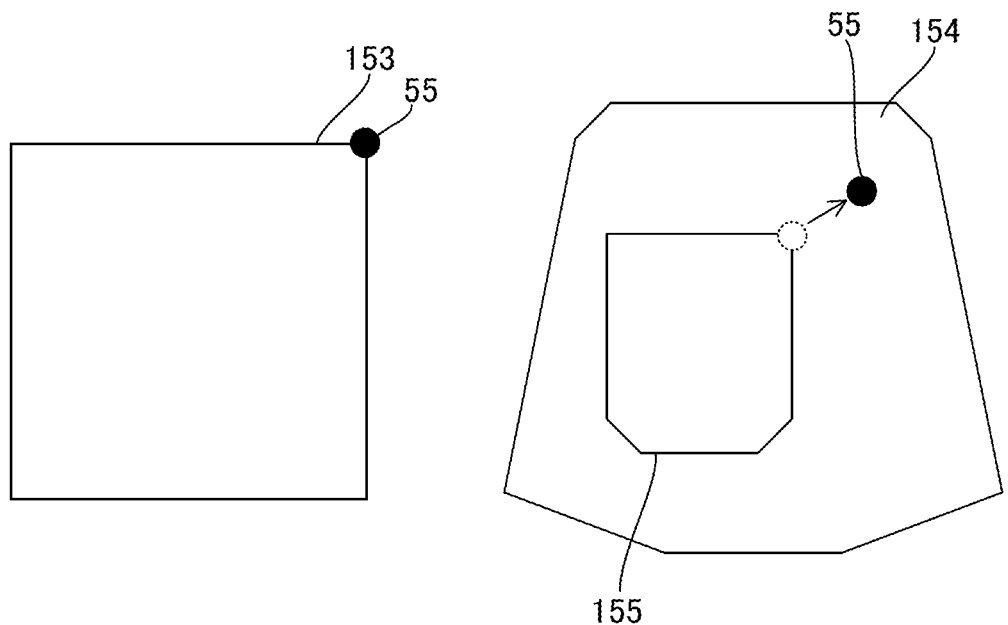
FIGS. 14A and 14B are diagrams showing exemplary sound localization setting screens that are displayed on the display 15.
Figure 14B:
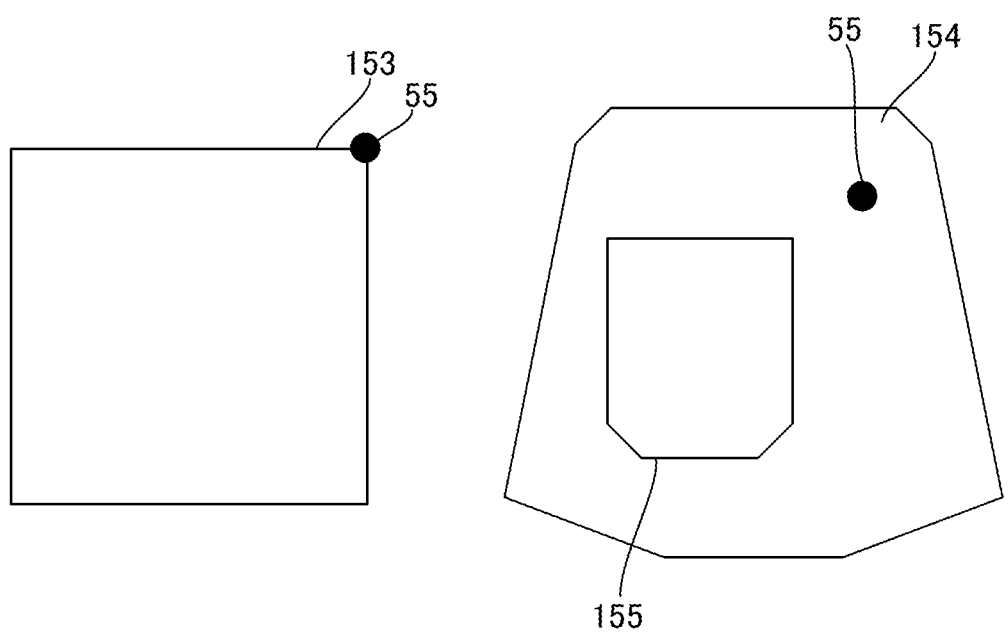

As shown in FIG. 14A, the user may change the position of the sound source 55 to the outside of the physical planar image 155 but within the physical planar image 154. The coordinates of the ends of the physical planar image 155 correspond to the coordinates of the ends of the logical planar image 153. Therefore, when the sound source 55 is positioned outside the physical planar image 155, the transformation section 143 carries out transformation in such a manner that at least one of the x-coordinate and the y-coordinate of the sound source 55 becomes 0 or 1 in the logical coordinate system, which indicates an end of the logical planar image 153. In the example of FIG. 14B, since the position of the sound source 55 is changed in such a manner that both the x-coordinate and the y-coordinate of the sound source 55 are out of the physical planar image 155, even the user changes the position of the sound source 55 to further upper right from the physical planar image 155, the coordinates of the position of the sound source 55 in the logical planar image 153 remain (x, y)=(1, 1).

The same applies to a group including a plurality of sound sources. When at least one of the sound sources in the group is moved out of the physical planar image 155, the transformation section 143 carries out transformation for the sound source moved out of the physical planar image 155 in such a manner that at least one of the x-coordinate and the y-coordinate of the sound source becomes 0 or 1 in the logical coordinate system. Regarding the other sound sources in the same group with the moved sound source mentioned above, the coordinates of these sound sources in the physical coordinate system are changed in such a manner that, in the physical coordinate system, the coordinates of the moved sound source and the coordinates of each of the other sound sources in the group maintain the supposed relative positional relationship.

Figure 15A:
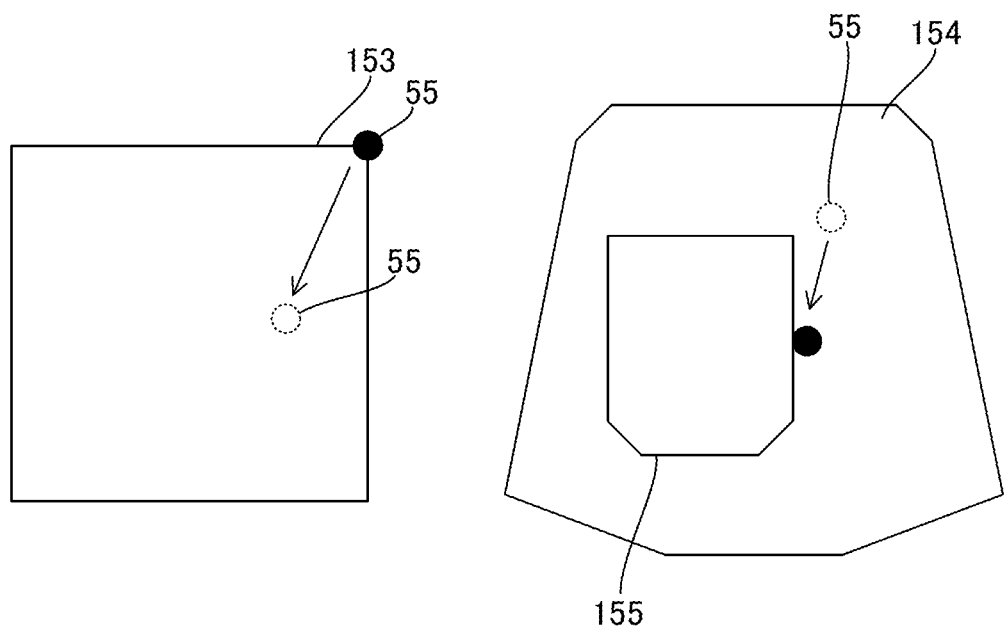
FIGS. 15A and 15B are diagrams showing exemplary sound localization setting screens that are displayed on the display 15.

As described above, the user edits the sound source 55 in the logical planar image 153 or the physical planar image 154. When the sound source 55 is positioned outside the physical planar image 155 as shown in FIG. 15A, the user may change the position of the sound source 55 in the logical planar image 153. As mentioned above, the physical planar image 155 in the physical coordinate system corresponds to the logical planar image 153 in the logical coordinate system. As in the case of FIG. 15A, when the sound source 55 is positioned outside the physical planar image 155, and the user changes the position of the sound source 55 in the logical planar image 153, if the transformation section 143 transforms the coordinates in the logical coordinate system into coordinates in the physical coordinate system, the position of the sound source 55 in the physical coordinate system is moved from the outside of the physical planar image 155 to the inside of the physical planar image 155 instantly. Audio equipment typically carries out sound localization processing based on the position of the sound source 55 in a physical coordinate system, and therefore, an instant change in the position of the sound source 55 in the physical coordinate system from the outside of the physical planar image 155 to the inside of the physical planar image 155 will cause a sudden change in the localization position of the sound image.

Figure 16:
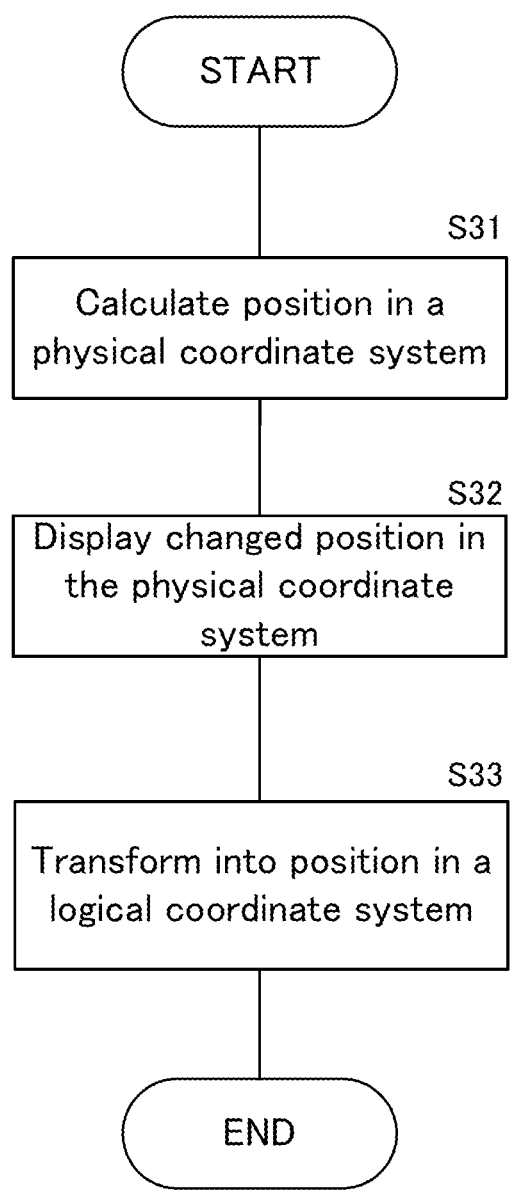
FIG. 16 is a flowchart showing a process carried out by the information processing device 1 or the information processing device 1A.

Therefore, the information processing device 1 or the information processing device 1A carries out the process shown by the flowchart of FIG. 16. When the information processing device 1 or 1A receives a change in the position of the sound source 55 in the logical coordinate system under a state that the position of the sound source 155 is outside the physical planar image 155, the information processing device 1 or 1A carries out the process shown by FIG. 16. First, the transformation section 143 calculates the position of the sound source 55 in the physical coordinate system, or in other words, the coordinates of the sound source in the physical coordinate system (first sound localization information) (S31). Specifically, the transformation section 143 calculates the relative position of the sound source 55 after the change to the position of the sound source 55 before the change in the logical coordinate system. In this case, the transformation section 143 relates the physical coordinate system, which is corresponding to the physical planar image 155, to the logical coordinate system, and transforms the relative position of the sound source 55 in the logical coordinate system into a relative position in the physical coordinate system. In another case, the transformation section 143 relates the physical coordinate system, which is corresponding to the physical planar image 154, to the logical coordinate system, and transforms the relative position of the sound source 55 in the logical coordinate system into a relative position in the physical coordinate system.

Alternatively, the transformation section 143 may relate the physical coordinate system that corresponds to the physical planar image 154 to the logical coordinate system, and transform the coordinates of the sound source 55 after the change in the logical coordinate system into coordinates of the sound source 55 after the change in the physical coordinate system, thereby calculating the position of the sound source 55 after the change in the physical coordinate system.

Thereafter, as shown in FIG. 15A, the display 15 first displays the position of the sound source 55 after the change in the physical planar image 154, which corresponds to the physical coordinate system (S32). In this regard, it is preferred that the display 15 displays the position of the sound source 55 after the change as a provisional position in the logical coordinate system by, for example, pale coloring or contour dotting.

Figure 15B:
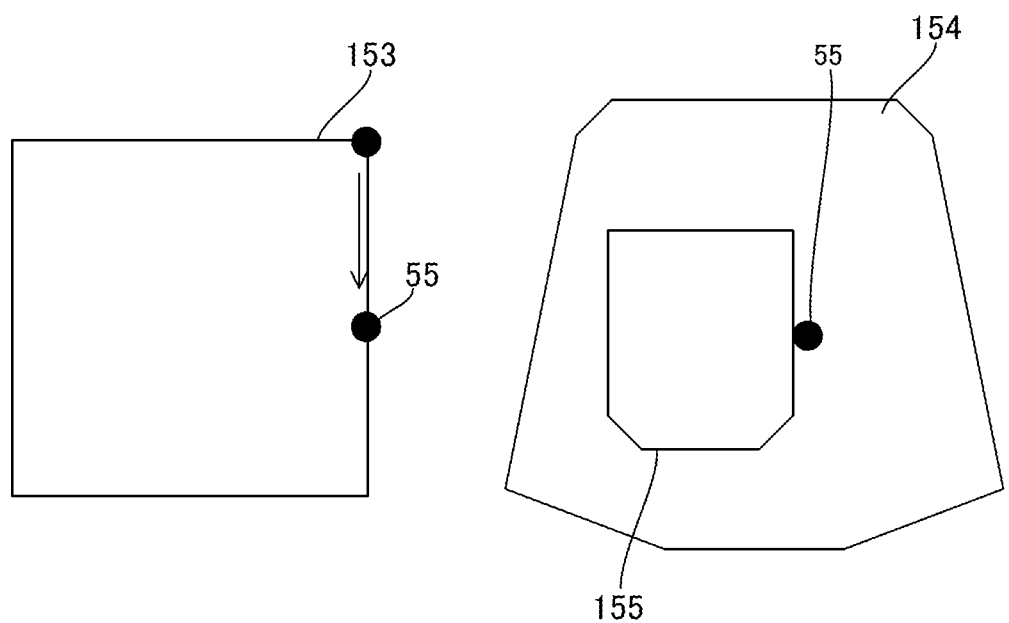

Next, the transformation section 143 transforms the coordinates of the sound source 55 in the physical coordinate system after the change into coordinates in the logical coordinate system, or to be more specifically, into coordinates indicating the position of the sound source in the logical coordinate system (second sound localization information) (S33). When the coordinates of the sound source 55 in the physical coordinate system are within the physical planar image 155, the coordinates of the sound source 55 in the logical coordinate system become within the logical planar image 153. However, when the coordinates of the sound source 55 in the physical coordinate system are out of the physical planar image 155, the transformation section 143 carries out transformation in such a manner that at least one of the x-coordinate and the y-coordinate of the sound source 55 in the logical coordinate system becomes 0 or 1, which indicates an end of the logical coordinate system. In this case, as shown in FIG. 15B, the sound source 55 in the logical coordinate system will remain at the end of the logical planar image 153.

As mentioned above, even a position change of the sound source 55 is made in the logical planar image 153 under a state that the sound source 55 is out of the physical planar image 155, in the physical coordinate system, a sudden position change of the sound source 55 can be avoided. Accordingly, a sudden change in the localization position of the sound image can be avoided. The process shown in FIG. 16 may be carried out not only when a position change of the sound source 55 is made in the logical coordinate system under a state that the sound source 55 is out of the physical planar image 155. The process shown in FIG. 16 may be carried out whenever a position change of the sound source 55 is made in the logical coordinate system.

Other Embodiments

An image of a logical coordinate system (the logical spatial image 151 or the logical planar image 153) and an image of a physical coordinate system (the physical spatial image 152 or the physical planar image 154) may be displayed on separate devices. For example, the image of the logical coordinate system may be displayed on the image processing device 1, and the image of the physical coordinate system may be displayed on the image processing device 1A. In this case, the image processing device 1 and the image processing device 1A are required to send and receive space information and information related to coordinates of a sound source to and from each other, thereby sharing the information.

In FIGS. 10 to 15, display of a sound source and coordinate transformation are carried out in a two-dimensional space (in a plane). However, display of a sound source and coordinate transformation may be carried out in a three-dimensional space. As shown in FIG. 8, the three-dimensional space information may include plane coordinates (x, y), and height information including a plurality of layers stacked in a height direction.

What is claimed is:
1. An information processing method comprising:
receiving:
first space information including a first coordinate system of one of a logical space or a physical space; and
second space information including a second coordinate system of the other of the logical space or the physical space,
wherein shapes of the logical space and the physical space are different so that shapes of the first coordinate system and the second coordinate system are different;
receiving first sound localization information indicating a position where a sound image is to be localized in the first coordinate system; and
transforming the first sound localization information into second sound localization information indicating a position where the sound image is to be localized in the second coordinate system.

2. The information processing method according to claim 1, further comprising:
acquiring an audio signal; and
localizing a sound image of the audio signal to the position indicated by the second sound localization information.

3. The information processing method according to claim 1, wherein the first space information and the second space information each include two-dimensional space information.

4. The information processing method according to claim 1, wherein the first space information and the second space information each include three-dimensional space information.

5. The information processing method according to claim 4, wherein each three-dimensional space information includes plane coordinates and height information related to a plurality of layers stacked in a height direction.

6. The information processing method according to claim 5, wherein the first sound localization information is transformed into the second sound localization information based on the height information corresponding to the plurality of layers.

7. The information processing method according to claim 1, wherein:
the first sound localization information is related to a group including a plurality of the sound images,
the information processing method further comprising:
when receiving a change in position of at least one of the sound images in the group, changing the first sound localization information while maintaining a relative positional relationship among the sound images in the group; and
transforming the first sound localization information of each of the plurality of the sound images in the group into the second sound localization information.

8. The information processing method according to claim 1, wherein:
the first space information is information related to the logical space, and
the second space information is information related to the physical space.

9. The information processing method according to claim 1, wherein:
the first space information is information related to the physical space, and
the second space information is information related to the logical space.

10. The information processing method according to claim 9, further comprising:
displaying the first space information, the second space information, the first sound localization information, and the second sound localization information; and
receiving a setting of third space information, which is another information related to the physical space, within the displayed first space information.

11. The information processing method according to claim 10, further comprising:
   receiving a change in the position of the sound image in the second space information; and
   calculating the first sound localization information based on the change received, and transforming the first sound localization information into the second sound localization information based on the third space information and the second space information.

12. An information processing device comprising:
   a memory storing instructions; and
   a processor that implements the instructions to execute a plurality of tasks, including:
      a space setting task that receives:
         first space information including a first coordinate system of one of a logical space or a physical space; and
         second space information including a second coordinate system of the other of the logical space or the physical space,
         wherein shapes of the logical space and the physical space are different so that shapes of the first coordinate system and the second coordinate system are different;
      a sound localizing information receiving task that receives first sound localization information indicating a position where a sound image is to be localized in the first coordinate system; and
      a transforming task that transforms the first sound localization information into second sound localization information indicating a position where the sound image is to be localized in the second coordinate system.

13. The information processing device according to claim 12, wherein the plurality of tasks include:
   an audio signal acquiring task that acquires an audio signal; and
   a localizing task that localizes the sound image to be localized, which is a sound image of the audio signal, to the position indicated by the second sound localization information.

14. The information processing device according to claim 12, wherein the first space information and the second space information each include two-dimensional space information.

15. The information processing device according to claim 12, wherein the first space information and the second space information each include three-dimensional space information.

16. The information processing device according to claim 15, wherein each three-dimensional space information includes plane coordinates and height information related to a plurality of layers stacked in a height direction.

17. The information processing device according to claim 16, wherein the first sound localization information is transformed into the second sound localization information based on the height information related to the plurality of layers.

18. The information processing device according to claim 12, wherein:
   the first sound localization information is related to a group including a plurality of the sound images,
   when a change in position of at least one of the sound images in the group is received in the sound localizing information receiving task, the sound localizing information receiving task further changes the first sound localization information while maintaining a relative positional relationship among the sound images in the group, and
   the transforming task further transforms the first sound localization information of each of the plurality of the sound images in the group into the second sound localization information.

19. The information processing device according to claim 12, wherein:
   the first space information is information related to the logical space, and
   the second space information is information related to the physical space.

20. The information processing device according to claim 12, wherein:
   the first space information is information related to the physical space, and
   the second space information is information related to the logical space.

21. The information processing device according to claim 12, further comprising:
   a user interface configured to receive input from a user for designating the first sound localization information,
   wherein the plurality of tasks include a displaying task that displays, in a display, the first space information, the second space information, the first sound localization information, and the second sound localization information.

22. The information processing device according to claim 21, wherein the user interface further receives a setting of third space information within the displayed first space information.

23. The information processing device according to claim 22, wherein when a change in the position of the sound image in the second space information is received by the user interface, the transforming task further calculates the first sound localization information based on the change received, and transforms the first sound localization information into the second sound localization information based on the third space information and the second space information.

24. A non-transitory storage medium storing a program executable by a computer to execute an information processing method comprising:
   receiving:
      first space information including a first coordinate system of one of a logical space or a physical space; and
      second space information including a second coordinate system of the other of the logical space or the physical space,
      wherein shapes of the logical space and the physical space are different so that shapes of the first coordinate system and the second coordinate system are different;
   receiving first sound localization information indicating a position where a sound image is to be localized in the first coordinate system; and
   transforming the first sound localization information into second sound localization information indicating a position where the sound image is to be localized in the second coordinate system.

* * * * *